United States Patent [19]
Tsuboi et al.

[11] Patent Number: 5,317,556
[45] Date of Patent: May 31, 1994

[54] INFORMATION PROCESSING APPARATUS AND OPTICAL HEAD INCORPORATED THEREIN

[75] Inventors: Nobuyoshi Tsuboi, Ibaraki; Yoshio Sato, Hitachi; Hiroyuki Minemura, Hitachi; Hisashi Andoh, Hitachi; Masaichi Nagai, Hitachi; Isao Ikuta, Iwaki; Yoshimi Katou, Takahagi; Yoshihito Maeda, Mito; Tatsuya Sugita, Hitachi; Yutaka Sugita, Tokorozawa, all of Japan

[73] Assignee: Hitachi, Ltd., Tokyo, Japan

[21] Appl. No.: 622,609

[22] Filed: Dec. 5, 1990

[30] Foreign Application Priority Data

Dec. 13, 1989 [JP] Japan ................... 1-321448

[51] Int. Cl.⁵ .................................... G11B 7/00
[52] U.S. Cl. ........................ 369/112; 369/13; 369/77.2; 369/44.14; 369/275.2; 360/114
[58] Field of Search ............. 369/112, 13, 77.2, 44.11, 369/44.28, 44.32, 44.27, 44.14, 44.22, 275.2, 275.3, 275.4; 360/114, 131–133; 359/642

[56] References Cited

U.S. PATENT DOCUMENTS

| | | | |
|---|---|---|---|
| 4,886,959 | 12/1989 | Hoshi et al. | 369/112 |
| 4,984,225 | 1/1991 | Ando | 360/114 |
| 5,031,165 | 7/1991 | Fujita | 369/44.28 |
| 5,105,408 | 4/1992 | Lee et al. | 369/44.15 |

FOREIGN PATENT DOCUMENTS

| | | | |
|---|---|---|---|
| 61-153889 | 7/1986 | Japan . | |
| 0115410 | 5/1987 | Japan | 369/44.14 |
| 63-228479 | 9/1988 | Japan . | |

OTHER PUBLICATIONS

Nikkei Electronics Nov. 21, 1983, pp. 189–213.

Primary Examiner—Aristotelis Psitos
Assistant Examiner—Nabil Hindi
Attorney, Agent, or Firm—Antonelli, Terry, Stout & Kraus

[57] ABSTRACT

There is provided a compact and thin optical disk unit as a memory unit suitable for a portable computer such as a book type computer and a portable recording/reproducing apparatus. In the optical disk unit, the diameter of an objective lens is limited and a beam shaping prism, a beam splitter, a mirror and a ¼ wavelength plate are formed into a unitary structure to make easy the optical axis adjustment of an optical head and ensure highly accurate assembling.

29 Claims, 11 Drawing Sheets

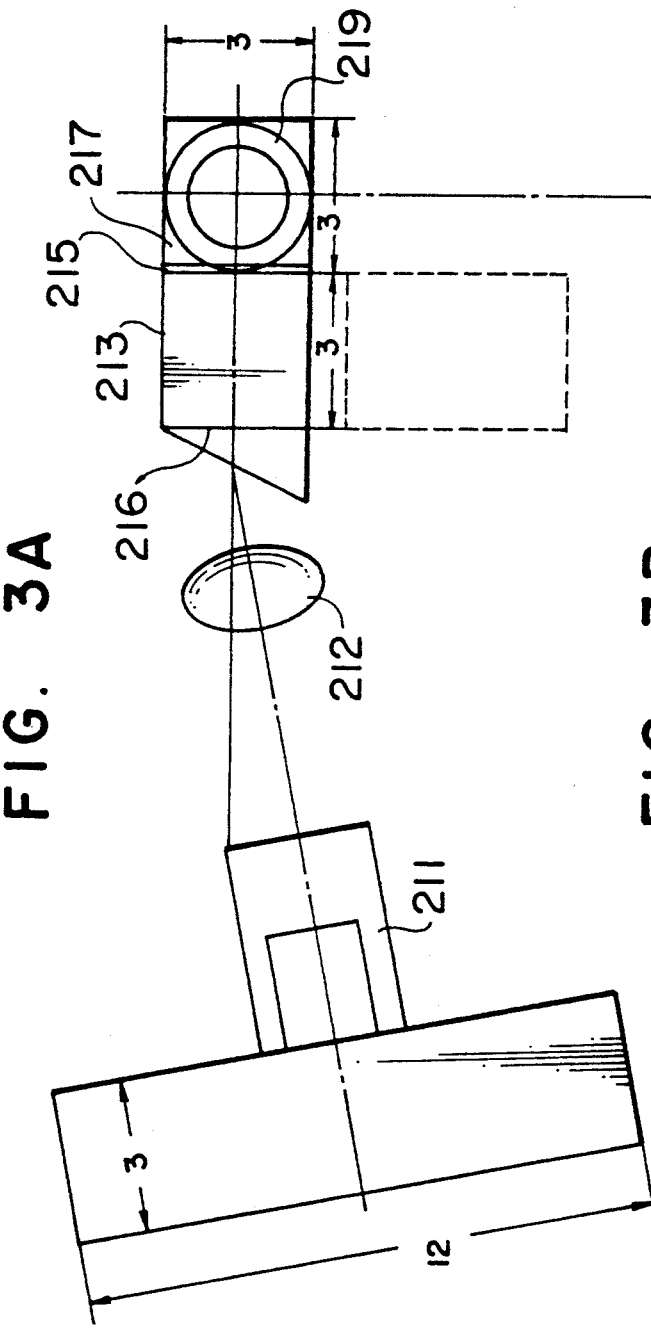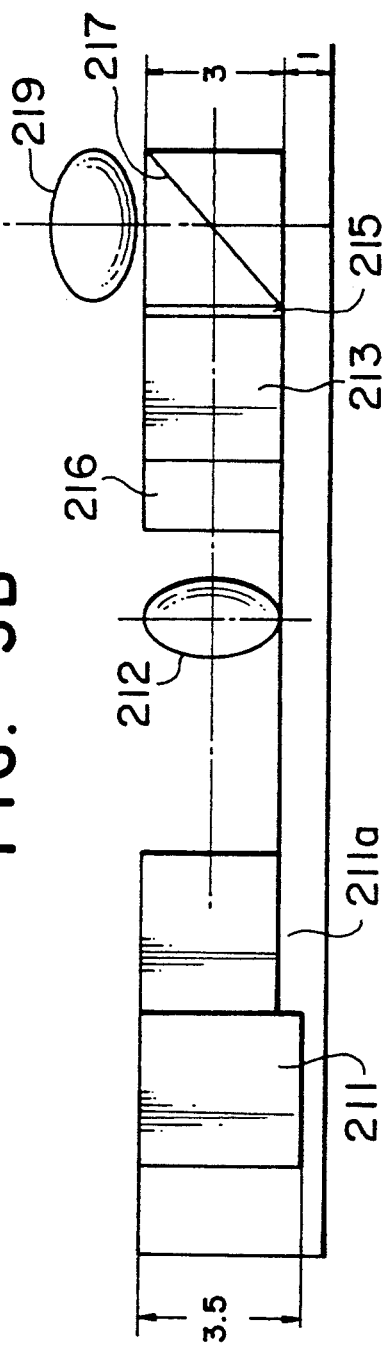

INFORMATION PROCESSING APPARATUS AND OPTICAL HEAD INCORPORATED THEREIN

BACKGROUND OF THE INVENTION

This invention relates to an information processing apparatus and an optical head incorporated therein. More particularly, the present invention relates to an information processing apparatus of high portability which has a reduced thickness and size and a small-sized, weight-reduced optical head for use in the apparatus.

When an optical disk is used as a memory of a portable information processing apparatus, such as a lap-top computer and the like, it is desirable for the optical disk to be provided with a protective case and to be reduced in thickness. In the conventional optical disk, the surface deflection of the disk was allowed to be about 1 mm, and the distance between disk substrate and objective lens surfaces, called the work distance, was set to be about 2 mm. Since the disk substrate had a thickness of 1.2 mm and this thickness was added to the thickness of the lens, the focal distance of the lens was required to be 4.0 mm or more, and the extent to which the thickness of the information processing apparatus could be reduced was limited.

On the other hand, on IC card, floppy disc or an optical card have been conventionally used as a memory of the portable information processing apparatus represented by a lap-top computer. However, concomitantly with an increase in throughput of the information processing apparatus, a need for handling large amounts of information, such as image data, has occurred. Under the circumstances, the conventional IC memory, floppy disk and optical card suffer from shortage of storage capacity, and so the near for a small-sized and large-capacity memory has arisen.

SUMMARY OF THE INVENTION

An object of the invention is to provide an information processing apparatus of high portability which has a reduced thickness and size.

Another object of the invention is to provide an information processing apparatus which is usable with a small-size large-capacity memory and a reduced thickness and size.

Still another object of the invention is to provide a small-sized, weight-reduced optical head which is suitable for incorporation in the information processing apparatus of high portability, and which can be accessed at high speeds.

Still another object of the invention is to provide an information processing method of high reliability.

An information processing apparatus of the invention comprises an optical recording medium for storage of information, an optical head for irradiating light, focused by means of an objective lens of an effective diameter of 3.8 mm or less as exemplified in Table 1, on the optical recording medium to execute at least one of recording information on the optical recording medium, reproducing information recorded on the optical recording medium and erasing information recorded on the optical recording medium, means for disposing the optical recording medium and the optical head in a predetermined relationship, means for rotating the optical recording medium, and a drive circuit for controlling the operation of the optical head and the rotation speed of the rotating means.

Preferably, the information processing apparatus of the invention further comprises a processor for applying a command to the drive circuit, means for inputting information to the processor and means for delivering information from the processor.

Available as the optical recording medium for at least one of recording, reproduction and erasing of information is a reproduction only type optical recording medium, a write-once type optical recording medium and a rewrite type optical recording medium.

In the reproduction only type optical recording medium, an uneven topography is formed on a plastic material by, for example, a stamper and a change in reflection factor is employed in order that the topography can be read as information.

The write-once type optical recording medium may be made of an inorganic material basically containing Te or an organic material of cyanine system or naphthalcyanine system. The rewrite type optical recording medium may be made of a crystal-amorphous phase change type recording material of In—Sb—Te type, Ge—Sb—Te type, In—Se—Tl type, In—Sb—Te type or Sb—Te type, or made of an optomagnetic recording material of Tb—Fe—Co type or Gd—Fe—Co type.

By using a case of credit card size having the above optical recording medium mounted therein and in which light is irradiated through a transparent portion of the case, a thin and easy-to-handle optical memory can be realized. This ensures realization of a compact memory having a capacity of 30MB or more when used with a beam spot diameter focused to the diffraction limit or of 50MB when used with a specified recording scheme, such as pit edge recording.

The optical head used for the present invention is featured by an objective lens of an effective diameter of 3.8 mm or less.

The present invention is grounded on the fact that the use of an objective lens having a small focal distance can be permitted by making the thickness of the disk substrate 1.2 mm or less or by making the work distance 2 mm or less.

The present invention is also grounded on findings that the surface deflection of a disk concomitant with rotation thereof is related to the effective diameter of the lens.

According to another aspect of the invention, an information processing apparatus comprises an optical memory in which an optical recording medium for least storage of information is rotatably incorporated in a case having a transparent portion, an optical head for irradiating light, focused by means of an objective lens having an effective diameter of 3.8 mm or less, on the optical recording medium through the transparent portion of the case to execute at least one of recording information on the optical recording medium, reproducing information recorded on the optical recording medium and erasing information recorded on the optical recording medium, rotation means for rotating the optical recording medium, and a drive circuit for controlling the operation of the optical head and the rotation speed of the rotation means.

According to another aspect of the invention, an information processing apparatus comprises an optical memory in which an optical recording medium formed on a substrate of a thickness of 1.0 mm or less and used for storage of information is rotatably incorporated in a case having a transparent portion, an optical head for irradiating light, focused by means of an objective lens having an effective diameter of 3.8 mm or less, on the optical recording medium through the transparent portion of the case to perform at least one of recording information on the optical recording medium, reproducing information recorded on the optical recording medium and erasing information recorded on the optical recording medium, rotation means for rotating the optical recording medium, and a drive circuit for controlling the operation of the optical head and speed of rotation of the rotation means, all of the above components being arranged in a space of 15 mm or less.

According to another aspect of the invention, an information processing apparatus comprises an optical memory in which an optical recording medium for storage of information is rotatably incorporated in a case having a transparent portion, an optical head for irradiating light, focused by means of an objective lens having an effective diameter of 3.8 mm or less, on the optical recording medium through the transparent portion of the case to perform at least one of recording information on the optical recording medium, reproducing information recorded on the optical recording medium and erasing information recorded on the optical recording medium, rotation means for rotating the optical recording medium with a surface deflection of 0.9 mm or less, and a drive circuit for controlling the operation of the optical head and the speed of rotation of the rotation means, all of the above components being arranged in a space of 15 mm or less.

According to another aspect of the invention, an information processing apparatus comprises an optical head adapted to operate for an optical memory in which an optical recording medium storage of information is rotatably incorporated in a case having a transparent portion and by irradiating light, focused by means of an objective lens having an effective diameter of 3.8 mm or less, on the optical recording medium through the transparent portion of the case to perform at least one of recording information on the optical recording medium, reproducing information recorded on the optical recording medium and erasing information recorded on the optical recording medium, means for disposing the optical memory and the optical head in a predetermined positional relationship, means for rotating the optical recording medium, and a drive circuit for controlling the operation of the optical head and speed of rotation of the rotation means.

According to another aspect of the invention, an information processing apparatus comprises an optical head adapted to operate for an optical memory in which an optical recording medium for storage of information is rotatably incorporated in a case having a transparent portion by irradiating light, focused by means of an objective lens having a focal distance of 3.8 mm or less, on the optical recording medium through the transparent portion of the case to perform at least one of recording information on the optical recording medium, reproducing information recorded on the optical recording medium and erasing information recorded on the optical recording medium, means for disposing the optical memory and the optical head in a predetermined positional relationship, means for rotating the optical recording medium, and a drive circuit for controlling the operation of the optical head and the rotation speed of the rotation means.

According to another aspect of the invention, an information processing apparatus comprises an optical head adapted to operate for an optical memory, in which an optical recording medium for storage of information is rotatably incorporated in a case having a transparent portion, to irradiate light, focused by means of an objective lens operated within a range of 1.8 mm or less, on the optical recording medium through the transparent portion of the case to perform at least one of recording information on the optical recording medium, reproducing information recorded on the optical recording medium and erasing information recorded on the optical recording medium, means for disposing the optical memory and the optical head in a predetermined positional relationship, means for rotating the optical recording medium, and a drive circuit for controlling the operation of the optical head and the speed of rotation of the rotation means.

According to another aspect of the invention, an information processing apparatus comprises an optical head adapted to operate for an optical memory in which an optical recording medium for storage of information is rotatably incorporated in a case having a transparent portion and adapted to irradiate light, passing through a collimate lens of an effective diameter of 4.0 mm or less for collimating dispersed light into a parallel beam and then focused by an objective lens, on the optical recording medium through the transparent portion of the case to perform at least one of recording information on the optical recording medium, reproducing information recorded on the optical recording medium and erasing information recorded on the optical recording medium, means for disposed the optical memory and the optical head in a predetermined positional relationship, means for rotating the optical recording medium, and a drive circuit for controlling the operation of the optical head and the speed of rotation of the rotation means.

According to another aspect of the invention, an information processing apparatus comprises an optical head adapted to operate for an optical memory in which an optical recording medium for storage of information is rotatably incorporated in a case having a transparent portion and adapted to irradiate light, passing through a collimate lens of a focal distance of 6.7 mm or less for collimating dispersed light into a parallel beam and then focused by an objective lens, on the optical recording medium through the transparent portion of the case to perform at least one of recording information on the optical recording medium, reproducing information recorded on the optical recording medium and erasing information recorded on the optical recording medium, means for incorporating the optical memory and the optical head in a predetermined positional relationship, means for rotating the optical recording medium, and a drive circuit for controlling the operation of the optical head and the speed of rotation of the rotation means. In order to obtain effective use of light of a semiconductor laser, a collimate lens having a short focal distance is best suited. However, because optical axis adjustment of the collimate lens of a short focal distance is difficult to achieve an objective lens diameter as shown in Tables 1 and 2 is employed so that a collimate lens diameter adaptable to the objective lens diameter may have a slightly increased value. Given that the collimate lens diameter is 4 mm, $D/2f$ may preferably be about 0.3 from the viewpoint of both the light utilization rate and optical axis alignment.

According to another aspect of the invention, an information processing apparatus comprises an optical head adapted to operate for an optical recording medium for storage of information and to irradiate light, focused by means of an objective lens having an effective diameter of 3.8 mm or less, on the optical recording medium so as to perform at least one of recording information on the optical recording medium, reproducing information record on the optical recording medium and erasing information recorded on the optical recording medium, means for disposing the optical recording medium and the optical head in a predetermined positional relationship, means for rotating the optical recording medium, and a drive circuit for controlling the operation of the optical head and the speed of rotation of the rotation means.

According to still another aspect of the invention, a method of performing by using an optical head having an objective lens for focusing light, at least one of recording information on an optical recording medium, reproducing information recorded on the optical recording medium and erasing information recorded on the optical recording medium comprises:

(a) causing relative motion between the optical head having an objective lens of an effective diameter of 3.8 mm or less and the optical recording medium, and (b) applying to the optical head a signal for recording information on the optical recording medium, reproducing information recorded on the optical recording medium or erasing information recorded on the optical recording medium.

According to still another aspect of the invention, an apparatus comprises an optical head having an objective lens for focusing light so as to perform at least one of recording information on an optical recording medium, reproducing information recorded on the optical recording medium and erasing information recorded on the optical recording medium, means for causing relative motion between the optical head and the optical recording medium, and means for applying to the optical head a signal for recording information on the optical recording medium, reproducing information recorded on the optical recording medium or erasing information recorded on the optical recording medium, the optical head having an objective lens of an effective diameter of 3.8 mm or less.

According to still another aspect of the invention, an optical head comprises a semiconductor laser as a light source, a collimate lens for collimating dispersed light emitted from the semiconductor laser into a parallel beam, a total reflection mirror for changing the optical path to irradiate the light beam passing through the collimate lens on an optical recording medium, an objective lens of an effective diameter of 3.8 mm or less for focusing the light by the total reflection mirror on the optical recording medium, and a beam splitter for leading the light beam reflected by the optical recording medium to a photodetector.

According to still another aspect of the invention, an optical head comprises a semiconductor laser as a light source, a collimate lens for collimating dispersed light emitted from the semiconductor laser into a parallel beam, an optical element of a unitary structure comprised of a prism for shaping the light beam passing through the collimate lens, a mirror for changing the optical path to irradiate the light beam shaped by the prism on an optical recording medium, a beam splitter for leading the light beam reflected by the optical recording medium to a photodetector and a ¼ wavelength plate for polarizing the light beam passing through the splitter and the light beam reflected by the optical recording medium, and an objective lens of an effective diameter of 3.8 mm or less for focusing the light beam reflected by the mirror on the optical recording medium.

According to still another aspect of the invention, an optical head comprises a semiconductor laser as a light source, a collimate lens for collimating dispersed light emitted from the semiconductor laser into a parallel beam, an optical element for shaping the light beam passing through the collimate lens, changing the optical path to irradiate the shaped light beam on an optical recording medium and leading the light beam reflected by the optical recording medium to a photodetector, and an objective lens of an effective diameter of 3.8 mm or less for focusing the light beam on the optical recording medium.

According to still another aspect of the invention, an optical head comprises a semiconductor laser as a light source, a collimate lens for collimating dispersed light emitted from the semiconductor laser into a parallel beam, an optical element for shaping the light beam passing through the collimate lens, changing the optical path to irradiate the shaped light beam on an optical recording medium and leading the light beam reflected by the optical recording medium to a photodetector, and an objective lens of an effective diameter of 3.8 mm or less for focusing the light beam on the optical recording medium, the photodetector for detecting the light beam led by the optical element and the semiconductor laser being arranged on the same side.

The present invention is accomplished by rotatably mounting the optical recording medium in the case having a transparent portion in such a way that the surface deflection of the disk is suppressed to below a gap existent inside the case.

The thickness of the disk substrate, conventionally measuring 1.2 mm, is decreased, thus making it possible to decrease the requisite focal distance of the objective lens.

The dynamic work distance of the actuator for driving the objective lens is limited to below the surface deflection of the disk. As the surface deflection of the disk increases, the dynamic work distance required for the actuator increases. The dynamic work distance forms a part of the focal distance required for the objective lens. The suppression of the surface deflection of the disk is significantly advantageous because the establishment of the relative distance is needed in order to prevent the objective lens from contacting the disk even when a detection error occurs upon disk search in the event that concomitantly with the surface deflection of the disk, an error occurs in the focus servo adapted for keeping the objective lens at a constant distance.

The relation between the surface deflection of the disk and the focal distance of the objective lens is shown in Tables 1 and 2. Firstly, to describe Table 1, the substrate thickness is the sum of thicknesses of protective case 120 and disk substrate 143 shown in FIGS. 1 and 12, and considering that the optical refractive index n of the protective case and disk substrate is about 1.5, a substrate thickness of 0.8 mm can be indicated in terms of the air path length which is an equivalent optical path length of about 0.53 mm of the substrate. In Table 1, disk substrate thicknesses of 0.8 mm and 0.5 mm are indicated as examples but obviously, the substrate thickness may take other values and in that case the substrate thickness in terms of air path length, that is, the equivalent optical path length (indicated in item of substrate thickness in Tables) changes. Table 2 shows a case where the disk substrate thickness is 1.2 mm.

TABLE 1

Focal distance required for objective lens
(objective lens thickness represents distance from main point to lens surface)

|  | Substrate 0.8 mm | | Substrate 0.5 mm | |
| --- | --- | --- | --- | --- |
|  | Surface deflection 0.5 mm | Surface deflection 0.3 mm | Surface deflection 0.3 mm | Surface deflection 0.1 mm |
| Substrate thickness | (0.8) 0.53 | 0.53 | (0.5) 0.33 | 0.33 |
| Objective lens thickness | 1.0 | 1.0 | 1.0 | 1.0 |
| Surface deflection | (±0.5) 1.0 | (±0.3) 0.6 | (±0.3) 0.6 | (±0.1) 0.2 |
| Margin | 0.2 | 0.2 | 0.1 | 0.1 |
| Focal distance | 2.73 | 2.33 | 2.03 | 1.63 |
| Objective lens effective diameter | 2.73 | 2.33 | 2.03 | 1.63 |

TABLE 2

Focal distance required for objective lens
(objective lens thickness represents distance
from main point to lens surface)

|  | Substrate 1.2 mm (unchanged) | | | |
| --- | --- | --- | --- | --- |
|  | Surface deflection 0.9 mm | Surface deflection 0.7 mm | Surface deflection 0.5 mm | Surface deflection 0.3 mm |
| Substrate thickness | (1.2) 0.8 | 0.8 | 0.8 | 0.8 |
| Objective lens thickness | 1.0 | 1.0 | 1.0 | 1.0 |
| Surface deflection | (±0.9) 1.8 | (±0.7) 1.4 | (±0.5) 1.0 | (±0.3) 0.6 |
| Margin | 0.2 | 0.2 | 0.2 | 0.2 |
| Focal distance | 3.8 | 3.4 | 3.0 | 2.6 |
| Objective lens effective diameter | 3.8 | 3.4 | 3.0 | 2.6 |

It will be appreciated from the foregoing that even when the distance between the recording surface of the disk and the objective lens is reduced and hence the focal distance of the objective lens is decreased, focus control can be effected by following the surface deflection of the disk. The focal distance was set to conform to the effective diameter of the objective lens which was decreased from 4 mm or more to 3.8 mm to 1.5 mm so as to obtain a NA of 0.5 to 0.55 comparable to the conventional NA. For example, when the effective diameter of the objective lens was set to be 2 mm, the focal distance was also set to be 2 mm. In this manner, optics can be realized which is capable of focusing the spot diameter to about 1.6 $\mu$m.

Thus, the luminous flux incident on the objective lens was reduced in size to about 4 mm to 1.8 mm and concomitantly therewith, the overall optics was reduced in size, thereby attaining thickness reduction and size reduction of the optical head.

For example, when the effective diameter of the objective lens was set to be 2 mm, the effective diameter of the collimate lens was reduced to, for example, 2.5 mm. This is because the objective lens is moved in the radial direction of the disk to perform tracking control and therefore the size of luminous flux is required to be larger than the effective diameter of the objective lens to provide a difference therebetween by which the effective diameter of the collimate lens is increased.

However, as compared to the prior art, the present invention decreased not only the effective diameter but also the focal distance of the collimate lens, in order for the collimate lens of decreased diameter to receive dispersed light of the semiconductor laser by the same amount as that received in the prior art to thereby prevent the utilization rate of light of the semiconductor laser from being degraded.

A collimate lens having a short focal distance makes it difficult to achieve alignment between the semiconductor laser and collimate lens and adjustment of the optical axis. In the present invention, optical elements of the prism for beam shaping, a polarized beam splitter, a total reflection mirror and a ¼ wavelength plate were put together to form a unitary structure. These functional components have been formed integrally also in the past but the unitary structure of the invention permitted the semiconductor laser and the detection system to be arranged on the same side, whereby the rotating disk and the optics were so arranged as not to cause interference therebetween, thereby realizing a significant size reduction.

In addition, the detection lens, Foucault prism and photodetector constituting a detection system for detecting a reflected beam from the optical disk were put together to form a unitary structure, whereby when a parallel beam was incident on the detection lens, an optical spot was focused on the photodetector to permit detection of an error signal of focus and tracking. The unitary detection system was arranged on the detection side of the composite prism. Even in the detection system in which the overall optics is reduced in size and therefore the alignment and axis adjustment are difficult to achieve, easiness of the alignment can be ensured by virture of the parallel beam on the detection side of the composite prism and the unitary structure of the photodetector. This permits the provision of highly accurate optics and easiness of the optical axis adjustment, thus ensuring that the optical axis can be so adjusted as to have a small inclination.

In the conventional optical disk, even when a 1.2 mm thick substrate is rotated with a surface deflection of about ±1 mm, focus control is carried out such that the objective lens has an accuracy of ±1 $\mu$m or less relative to the focal distance. The focus control is done by detecting a reflected beam from the disk to obtain a focus error signal and feeding back the focus error signal to the servo circuit. The focus error signal is obtained when the relative position between the disk and objective lens falls within a range of about ±20 $\mu$m relative to the focal distance. This range is called a servo pull-in region. Accordingly, the control is effected in such a way that the objective lens is initially moved to the pull-in region and upon detection of the objective lens reaching the region, the switch of the servo circuit is turned on. Generally, in this type of control scheme in which the objective lens is initially moved to the pull-in region, the objective lens is first caused to move away from the disk in response to a focus servo on-signal and thereafter to approach the disk at a low speed, with the result that even the disk undergoing a surface deflection can pass through the associated pull-in region. Then, by detecting that the objective lens falls within the region, the switch of the servo circuit is closed. Typically, when it is detected that the objective lens is positioned in the region, the switch of the servo circuit is closed to establish the servo circuit. Control subsequently effected is such that the objective lens follows the surface deflection of the disk. However, in the event that the pull-in region cannot be detected for some reason, the switch of the servo circuit is not closed with the result that the objective lens approaches the disk and ultimately the actuator for the objective lens is extended for the maximum stroke. This situation typically corresponds to erroneous detection of the disk. Under this condition, a voltage is applied to the actuator in a direction in which the objective lens is first caused to move away from the disk and thereafter a voltage for causing the objective lens to again approach the disk is applied to the actuator. But when the disk is rotated with a surface deflection with the objective lens extremely extended toward the disk, there is a risk that the lens and disk come into contact with each other and are damaged. Here, it is of significance to note that light for reading and writing is irradiated on the optical disk through the substrate to lessen degradation of the signal to noise ratio (S/N ratio) due to dust deposited on the substrate surface and scratches thereon. But degradation of the signal to noise ratio (S/N ratio) in order that dust and scratches on the substrate surface is sometimes so serious that an error is caused in reading data. Typically, discrete read errors due to an appreciable amount of dust can be corrected but a continuous read error due to scratches cut in the substrate surface can not be corrected, resulting in data read or error correction becoming impossible in the information processing apparatus, which is not acceptable. Accordingly, the conventional design was such that the objective lens was distant enough not to contact the disk even when the disk was subjected to a surface deflection under the condition that the actuator for the objective lens becomes extremely extended for the maximum stroke. The surface deflection of the disk depends on the curvature of the disk substrate and the degree of snug fitting of the disk in the disk holder. Typically, the surface deflection is 0.2 mm or less but with the view of maintaining absolute security of information as described previously, the objective lens must be spaced enough not to contact the disk substrate even when a surface deflection of about 1 mm takes place. Therefore the conventional objective lens had a focal distance of 4 mm or more. Conversely, in the present invention, the optical disk was incorporated in the protective case in such a way that the surface deflection of the disk could be suppressed to below a predetermined value. Table 1 shows the focal distance required for the objective lens when the surface deflection is regulated and the substrate thickness is changed, indicating that even with the focal distance of the objective lens shortened, the disk substrate and the objective lens do not contact each other. The invention features the reduction in the focal distance of the objective lens. The protective case adapted to regulate the surface deflection was made to be transparent at least at a light incident portion. The protective case was effective to minimize the amount of dust deposited on the surface of the optical disk substrate. The invention also has the feature that the light beam for recording, reproduction and erasing is irradiated on the optical disk through the transparent protective plate, thus providing a countermeasure for suppressing the occurrence of errors due to dust even when the substrate thickness is decreased, whereby the reduction in thickness of the 1.2 mm thick substrate, considered impossible in the conventional optical disk, can be permitted to ensure that the objective lens diameter can be decreased and hence the thickness of the overall optical disk memory can be decreased.

In accordance with the invention, the surface deflection of the disk was decreased to below a predetermined value to permit the lens diameter of the objective lens to be reduced to thereby accomplish the reduction in thickness of the optical head.

Also, the apparatus incorporating the thin optical head could be reduced in thickness and size.

Further, since the optical disk incorporating the card is protected and reproduction errors due to deposited dust and dirt can be prevented, a thin and highly reliable optical disk in card memory of large capacity can be realized. Moreover, by utilizing the optical disk in card memory of the present invention, a thin lap-top type computer having a large-capacity memory, a large-capacity still camera and a medical, portable type personal data base having a large-capacity memory can be realized.

BRIEF DESCRIPTION OF THE DRAWINGS

FIGS. 3A and 3B are diagrams for explaining the concept of an optical disk in card according to the invention;

DESCRIPTION OF THE PREFERRED EMBODIMENTS

Figure 1:
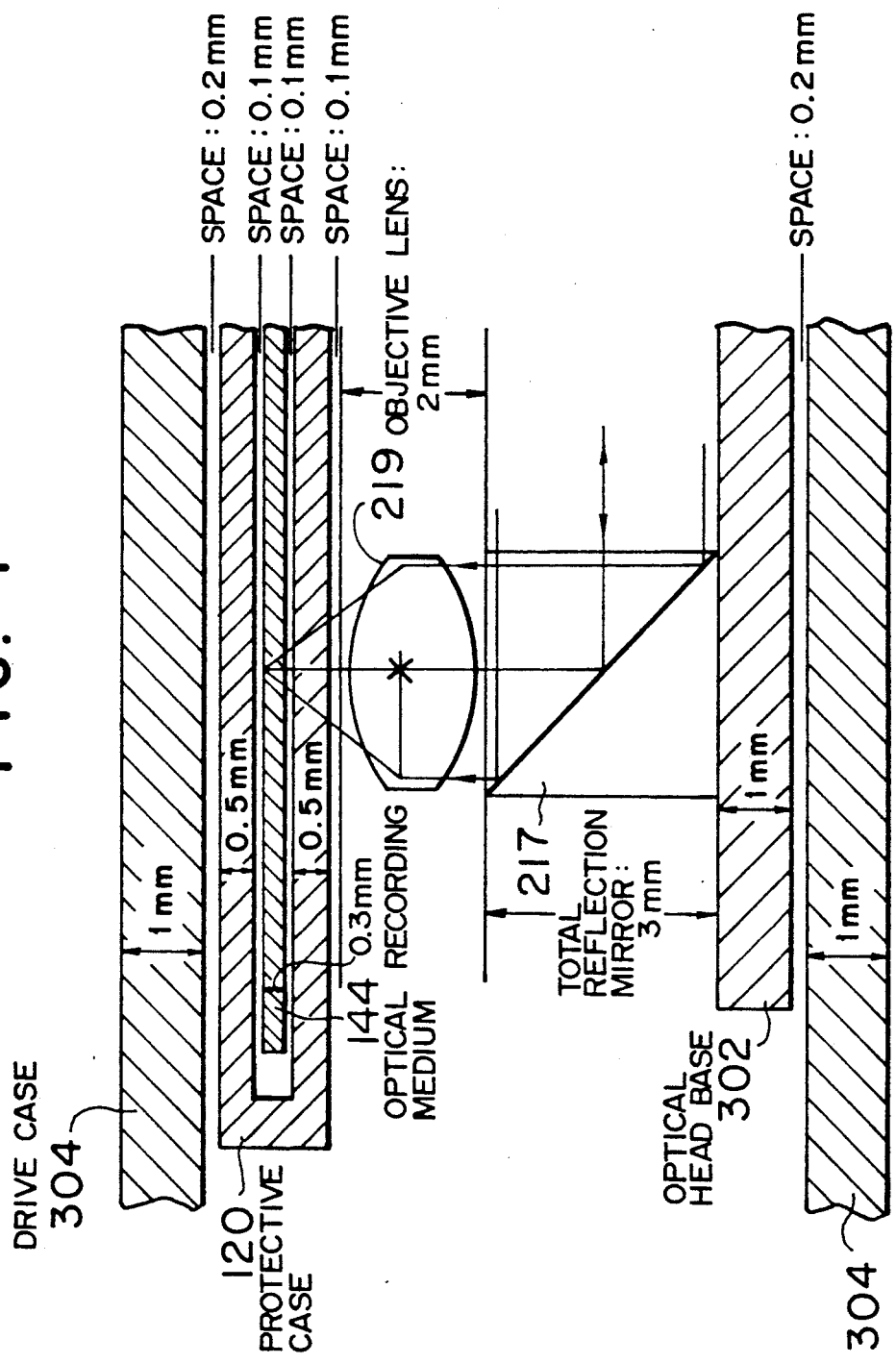
FIG. 1 is a schematic diagram showing an embodiment of optics according to the invention.

A first embodiment of the invention will now be described with reference to FIG. 1. FIG. 1 shows a case where light is irradiated on an optical memory having an optical recording medium incorporated in a protective case having a transparent portion.

In the present embodiment, in order to reduce the thickness of an optical disk drive as a whole, the optical recording medium per se, as designated by reference numeral 144, is reduced in thickness and incorporated in a card-shaped transparent protective case 120. This is herein termed "an optical disk in card". The optical disk in card is so designed that dust in the air can be prevented from depositing on the substrate and the surface deflection of the disk can be suppressed to a maximum deflection which is less than the wrath of the space between the disk and the case. For example, given that the space on either side of the disk is 0.1 mm and the thickness of the protective case 120 on either side of the disk is 0.5 mm, the optical disk in card can be 1.5 mm with a disk which is 0.3 mm in thickness.

Since the space on either side of the optical disk is 0.1 mm, it will be seen that the objective lens 219 has a vertical operating stroke of only 0.2 mm. Typically, the focal distance of a lens represents the distance from a principal point and when a glass thickness of the objective lens is 1 mm between a principal point on the disk side and the lens surface, the objective lens has a focal distance of 2 mm. Given that the numerical aperture (NA) of the objective lens is 0.5, the objective lens has an effective diameter of 2 mm. Taking into consideration the fact that the objective lens moves for tracking, flux of light incident on the objective lens 219 may be of 2.5 mm and a total reflection mirror 217 may be of about 3 mm which is slightly larger than 2.5 mm of the flux of light. When an optical head base 302 has a thickness of 1 mm and this optical head along with the optical disk in card is incorporated in a 1 mm thick drive case 304, leaving a space of 0.2 mm therebetween, the optical disk drive can have a thickness of 10 mm as a whole.

Figure 16:
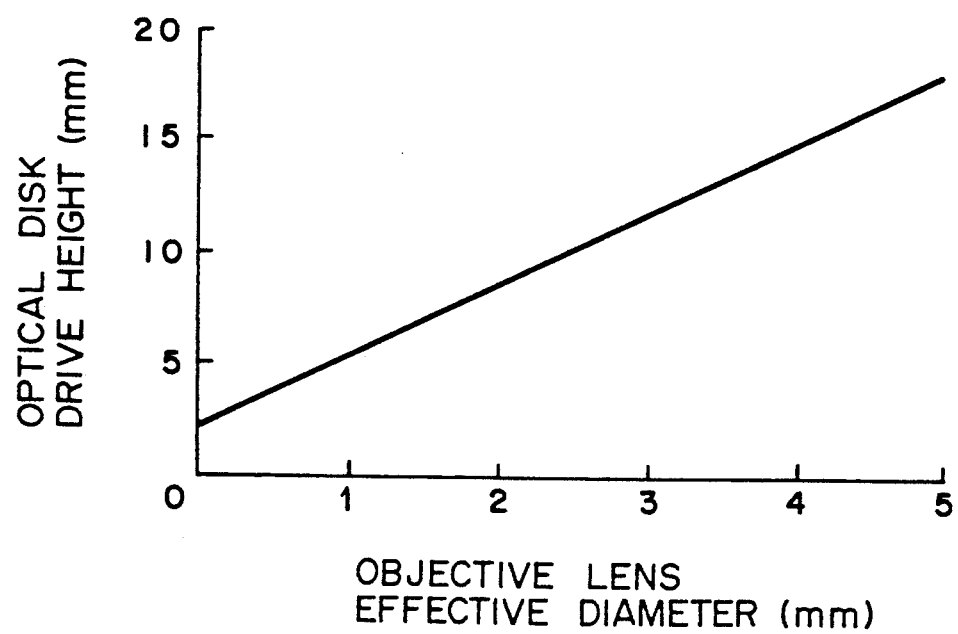
FIG. 16 is a graph showing the relation between height of optical disk drive and effective diameter of objective lens.

The objective lens has exemplarily been described as having a 2 mm effective diameter but conveniently the objective lens diameter may be 1 to 3.8 mm depending on the space between protective case 120 and optical recording medium 144 in the optical disk in card, as shown in Tables 1 and 2. Conveniently, the optical head base and drive case can also measure 2 to 3 mm. Accordingly, height h of the optical disk drive can be expressed in terms of effective diameter d, as graphically shown in FIG. 16, indicating that the entirety of the optical disk drive can measure 6 to 15 mm.

Figure 2:
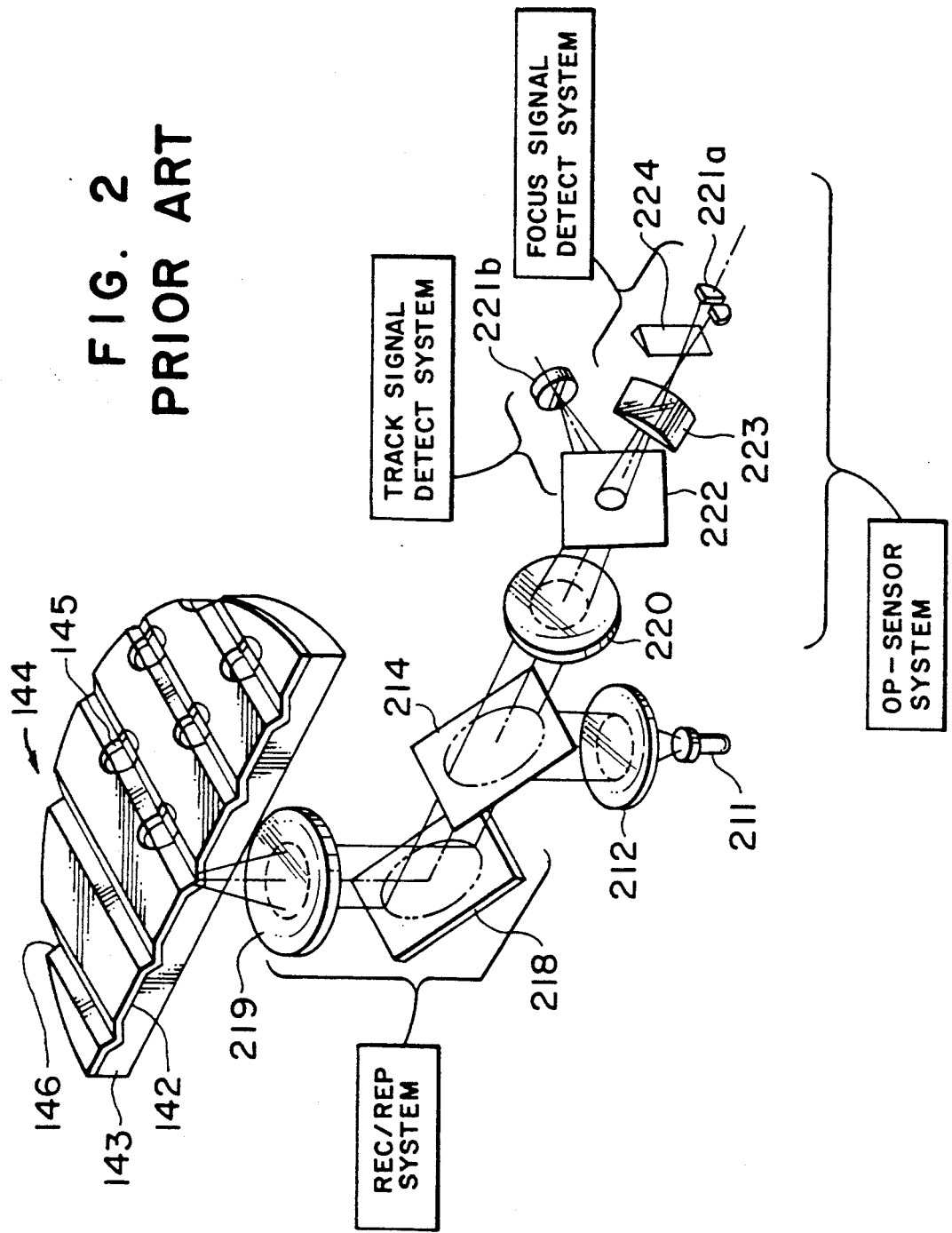
FIG. 2 is a diagram showing an example of optical disk and optical head of a prior art optics.

FIG. 2 shows the optics of an optical head as described in Nikkei Electronics, Nov. 21, 1983, pp. 189-213.

As shown in FIG. 2, a memory or optical recording medium 144 (hereinafter described by way of an optical disk) comprises a substrate 143 and a recording film 142, and the substrate 143 is formed with track guide grooves 146 of a pitch of about 1.6 μm and pits 145 of a diameter of about 0.8 μm. To cope with dust deposited on the recording film 142, the substrate 143 of the optical disk has a thickness of about 1.2 mm.

On the other hand, the optical head comprises a semiconductor laser 211, a collimate lens 212 for preparation of a parallel beam, a beam splitter 214, a total reflection mirror 218 for changing the light path, an objective lens 219 for focusing light on the disk, a detection lens 220 for focusing light from the beam splitter 214 onto an optical sensor system, a half mirror 222 for separating the light into a component directed to a track signal detect system and a component directed to a focus signal detect system, a cylindrical lens 223 and an edge prism 224 for focus signal detection, and sensors 221a and 221b for focus error detection and tracking error detection.

With the optics constructed as described above, light emitted from the semiconductor laser 211 is reflected at the beam splitter 214 and focused on the recording film 142 of the optical disk by means of the objective lens 219. A light beam reflected from the optical disk is transmitted through the beam splitter 214 and is measured as a focus error signal by means of the sensor 221a. In the presence of a focus error, the signal is fed back to an actuator, not shown, for driving the objective lens 219 so that the position of the objective lens 219 may be moved to the in-focus position. The sensor 221b detects a tracking error signal so that the total reflection mirror 218 may be rotated for tracking the track guide groove 146. Under this condition, the prior art optical head carries out recording and reproduction of signals while performing focus control and tracking control.

Upon recording, a laser beam of about 20 mW is emitted from the semiconductor laser 211 to bore pits (holes) in the recording film and upon reproduction of a signal, a laser beam of about 4 mW is emitted from the semiconductor laser 211 to reproduce information as a change in reflection factor due to the presence or absence of a pit.

The aforementioned optical head irradiates the light beam on the recording film through the substrate of 1.2 mm thickness as shown in FIG. 2. Accordingly, even when the beam is to be focused to form a light or optical spot of about 1 μm on the surface of the recording film, the beam irradiating the substrate surface is permitted to have the form of a large light spot of about 1 mm. Consequently, the dust present on the substrate surface results in an about 1/1000 reduced corresponding noise on the recording film surface and degradation of signals due to the dust on the substrate surface can advantageously be suppressed.

It has been found that when the substrate thickness is 1.2 mm (about 0.8 mm in terms of equivalent optical path length), the surface deflection of the disk is ±1.0 mm and the margin is 0.2 mm, the focal distance of the objective lens measures about 4.0 mm or more.

The light spot diameter d obtained on the recording film surface at the focal position is indicated by $$d = \lambda/NA \quad (1)$$

where
NA: D/2f
$\lambda$: wavelength of used light
D: effective diameter of objective lens
f: focal distance of objective lens.

Thus, the light spot diameter d is inversely proportional to NA. More specifically, the light spot diameter d is inversely proportional to lens diameter D and directly proportional to focal distance f. The objective lens for high-density recording is required to have a NA value of 0.5 or more and it is necessary to use an objective lens having an effective diameter equal to or larger than the focal distance. Since the information processing apparatus using the optical head has a thickness which is approximately twice the effective diameter of the objective lens, the reduction in thickness of the apparatus can not be achieved unless the effective diameter is made to be as small as possible.

Recorded in the information processing apparatus is data which is so important as not to be evaluated in terms of money and therefore the optical head requires that the optical disk and the objective lens be insufficiently distant from each other that they do not contact with each other. In other words, it has been found that even in an apparatus of short focal distance, the objective lens must have a focal distance which is 4 mm or more.

In case where a semiconductor laser of a wavelength of 830 nm is used with NA being 0.5 or more in order to obtain a light spot diameter focused to about 1.6 μm in accordance with equation (1), an objective lens used, having a focal distance of 4 mm, is required to have an effective diameter which is 4 mm or more. To meet effective use of the NA of the objective lens, luminous flux whose size exceeds the effective diameter must be irradiated and the structural dimensions of the optical elements including the beam splitter shown in FIG. 2 are obviously required to exceed the size of the luminous flux. In other words, it has been found that once the effective diameter of the objective lens is determined, this dominates determination of structural dimensions of the collimate lens and other optical elements. This implies that if the size reduction of the objective lens is possible, the thickness reduction and size reduction of the apparatus can be ensured.

FIGS. 3A and 3B show the overall optics except for the detection system. FIG. 3A is a plan view and FIG. 3B is a side view. Referring to FIGS. 3A and 3B, dispersed light from the semiconductor laser 211 is collimated by the collimate lens 212 to form a light beam which in turn impinges upon a shaping prism 216. The incident light beam is an elliptical beam resembling the output pattern of the semiconductor laser, but is shaped into a substantially circular beam by the shaping prism 216 and thereafter is transmitted through a polarization beam splitter 213. The transmitted beam is polarized into a circular polarized beam by means of a ¼ wavelength plate 215. Subsequently, the light beam is deflected vertically by means of an up mirror (total reflection mirror) 217 and then focused by the objective lens 219 so as to be irradiated on the film surface of the optical recording medium 144 in the optical disk in card. The collimate lens 212, shaping prism 216, polarization beam splitter 213, ¼ wavelength plate 215 and up mirror 217 are formed integrally and the unitary assembly together with the semiconductor laser 211 is mounted on an optical head holder 211a.

Figure 4:
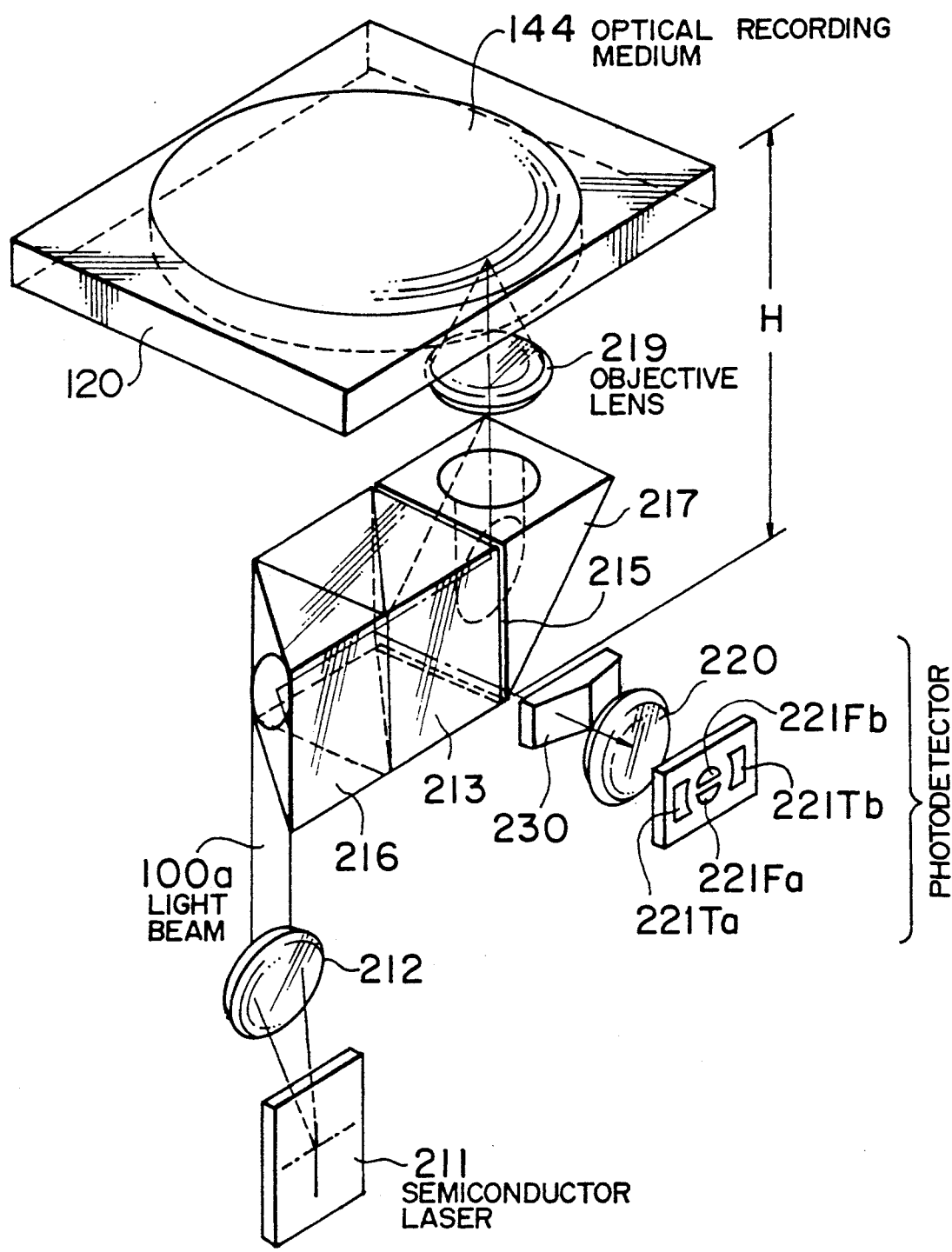
FIG. 4 is a perspective view of an optical head for implementation of the invention.

FIG. 4 schematically shows the overall optics of the optical head when the optical disk in card is used. In FIG. 4, identical members to those of FIGS. 3A and 3B are used, and identical characters to those in FIGS. 3A and 3B are used to designate them. It is to be noted that this optical head performs focus detection through use of the knife edge method.

As explained in relation to FIGS. 3A and 3B, light emitted from the semiconductor laser 211 is converted into a parallel or collimated beam (hereinafter referred to as light beam 100a). The light beam 100a has an elliptical beam shape resembling the pattern emitted from the semiconductor laser. The optical axis of this elliptically shaped beam is deflected by the shaping prism 216 so that the elliptical beam may be shaped into a substantially circular beam. The thus shaped beam is then directed to the polarization beam splitter 213. The output light from the semiconductor laser is linear polarized light which is so set as to be a P wave in relation to the polarization beam splitter 213 and therefore can transmit through the polarization beam splitter 213. Subsequently, the beam 100a is polarized to a circular polarized beam by means of the ¼ wavelength plate 215 and is then deflected vertically by means of the total reflection mirror 217. The light beam 100a in the form of the circular polarized beam is focused by the objective lens 219 and irradiated on the film surface of the optical recording medium 144.

A reflected beam from a spot image-formed on the optical recording medium 144 is converted into a parallel beam by the objective lens 219, then subjected to optical path change by the total reflection mirror 217 and polarized to an S wave by means of the ¼ wavelength plate 215. The light beam 100a in the form of the S wave is reflected by the polarization beam splitter 213 and subjected to optical path change in the direction of a Foucault prism 230. Substantially half of the light beam 100a is changed in direction by means of the Foucault prism 230 serving as a knife edge and is then image-formed, by the detection lens 220, on two divisional light receiving surfaces of photodetectors 221Ta and 221Tb for tracking servo control. Since the edge of the Foucault prism 230 acts as a knife edge, the remainder of the light beam is image-formed on two vertically divided light receiving surfaces of photodetectors 221Fa and 221Fb for focus servo control.

In compliance with the relative distance between the objective lens and the disk, voltages detected by the photodetectors 221Fa and 221Fb change. The difference signal between the detected voltages will be hereinafter called a focus error signal. When the relative distance between the objective lens and the disk falls within the vicinity of the focal distance of the objective lens, the focus error signal is proportional to the distance and its polarity is inverted at the focal distance. Therefore, by feeding back the focus error signal to a servo circuit not shown after the relative distance between the objective lens and the disk falls within this region, auto-focusing can be carried out.

On the other hand, a substantial half of the luminous flux whose direction is changed by the Foucault prism 230 is image-formed on the photodetectors 221Ta and 221Tb for tracking servo control having the two divided light receiving surfaces in the tracking direction. As in the focus error signal, detected signals provide a position error from a predetermined radial guide groove in the disk. This position error is called a tracking error signal. By feeding back the tracking error signal to a comparator of the servo circuit not shown, tracking can be carried out. Through the auto-focusing and tracking control, the laser beam focused to a spot diameter of about 1 μm can be irradiated on tracks formed, as described previously, at a pitch of 1.6 μm in the optical disk whose surface deflects by several of tens of micrometers. A reproduction signal is produced from an adder circuit adapted to add together signals from the photodetectors 221Ta, 221Tb, 221Fa and 221Fb.

Figure 5A:
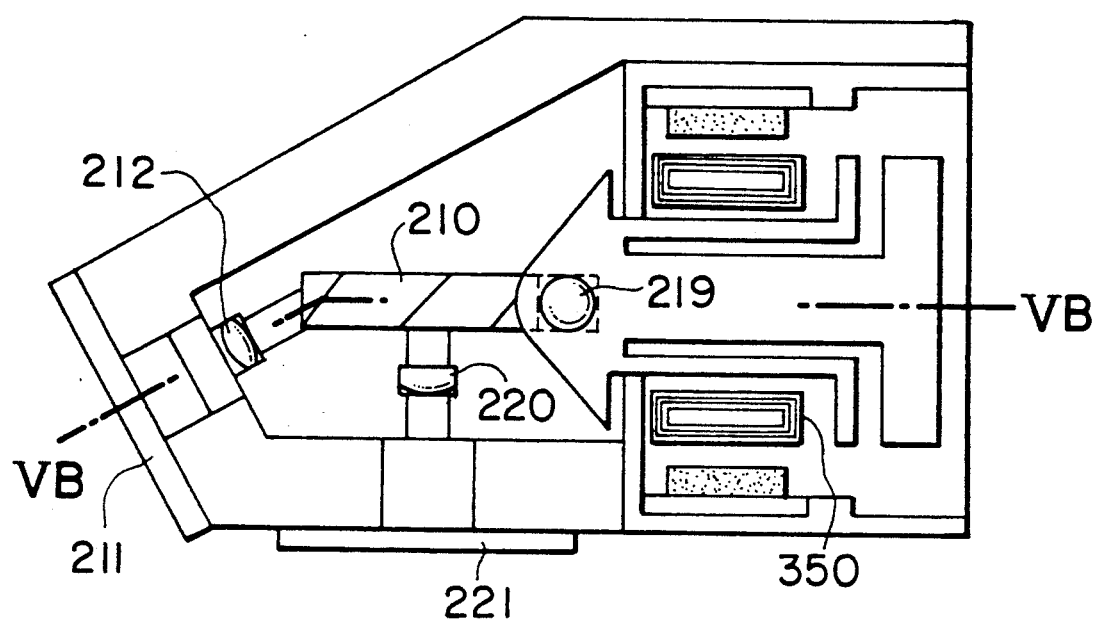
FIG. 5A is a plan view showing the optics according to the invention.
Figure 5B:
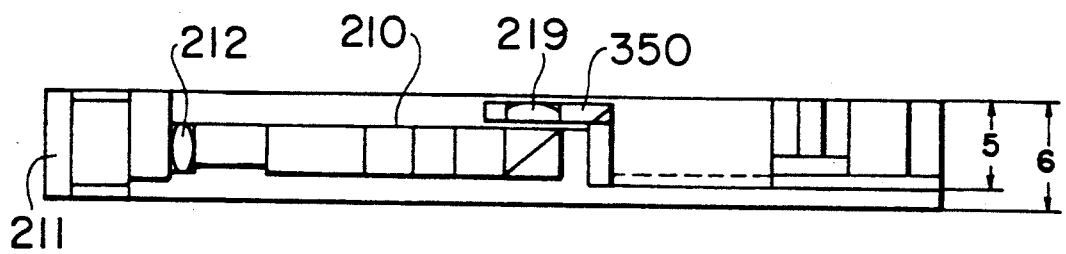
FIG. 5B is a sectional view taken on the arrow line VB—VB of FIG. 5A.

FIGS. 5A and 5B are a plan view and a side view of a practical optical head incorporating the optics of FIG. 4. The semiconductor laser 211 has to be mounted with respect to a complex prism 210 with a high accuracy of relative mount angle to ensure that beam shaping can be permitted and the optical axis can be set vertically to the disk. When the NA value of the collimate lens 212 is set to be large to obtain the most effective use of dispersed light of the semiconductor laser 211, the relative position between the semiconductor laser 211 and the collimate lens 212 needs to be set with high accuracy. Therefore, the optics covering the shaping prism and total reflection mirror is integrally formed as the complex prism 210, thereby substantially nullifying misalignment between the optical axis of the semiconductor laser 211 and that of the optics excepting the detection system. Thus, the optics the shaping prism to the total reflection mirror is called complex prism 210. Also, with a view toward reducing the size of not only the optical head, but also the rotary drive system of the optical disk in card, wiring sections of the semiconductor laser and the photodetectors are so designed as to extend in the same direction. In FIGS. 5A and 5B, character 350 designates an objective lens actuator, 219 the objective lens, 220 the detection lens and 221 the photodetector.

Figure 6:
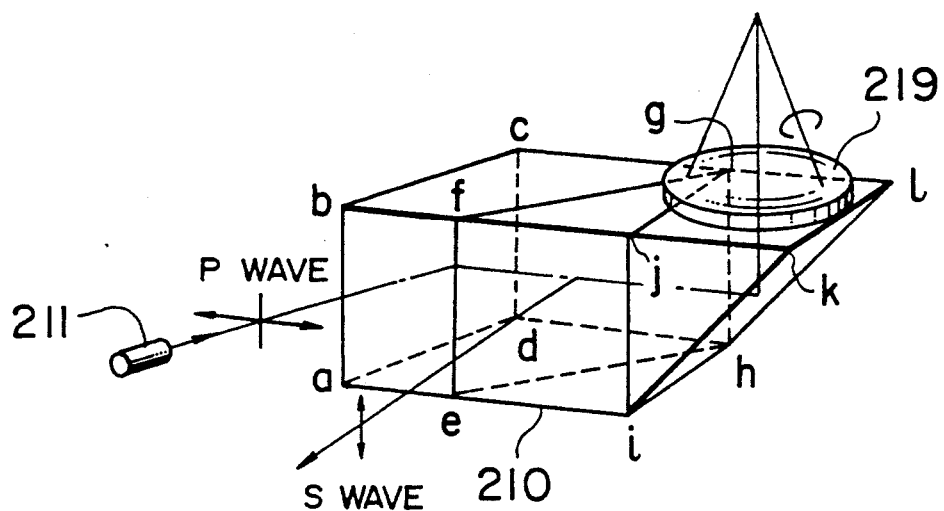
FIGS. 6 to 9 are diagrammatic representations useful to explain the optics in the form of a module according to the invention.

FIG. 6 shows the detection system extracted from FIG. 4 to provide the complex prism 210 in which the semiconductor laser 211 and the objective lens 219 are seen from a different view angle. The assembly for explaining the optics mainly constituting the complex prism 210 and including the elements prom the shaping prism to total reflection mirror is made of optical glass and has apices a to l.

Figure 7:
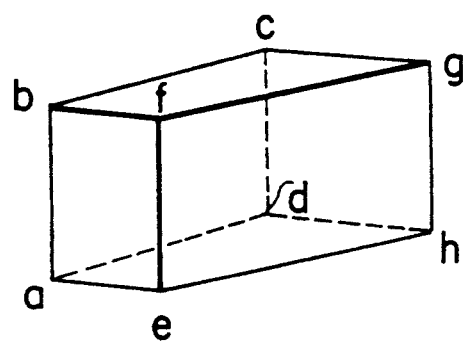

An elliptical light beam emitted from the semiconductor laser 211 impinges upon a surface abcd of the shaping prism particularly shown in FIG. 7 and is refracted so as to be converted into a substantially circular beam. This light beam is incident at 45° on a surface efgh serving as a polarization film and most of the beam transmits therethrough. This is because the semiconductor laser is so set that the linear polarized beam emitted therefrom is subjected to P polarization at the surface efgh, and a film serving as the polarization beam splitter 213 is coated on the surface efgh. The input beam is incident at a large angle of about 72° on the surface abcd and therefore a reflection preventive film may preferably be coated on this surface.

Figure 8:
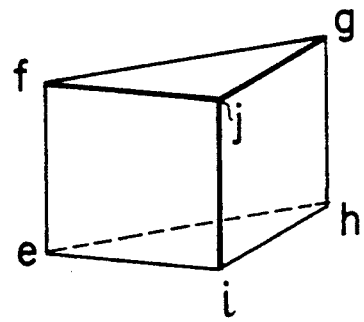

FIG. 8 shows a prism in the form of an equilateral triangle pole having a surface efgh which contacts the surface efgh of FIG. 7. The light beam is incident at 45° on this surface efgh and transmits through the ¼ wavelength plate coated on a surface ijgh. As a result, the light beam changes from a P polarized beam to a circular polarized beam. It is desirable that the prisms shown in FIGS. 8 and 9 are formed together.

Figure 9:
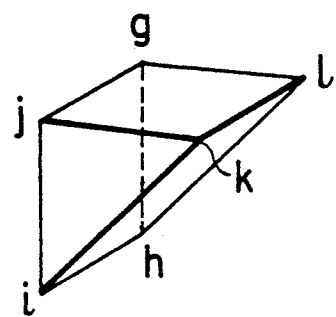

FIG. 9 also shows a prism in the form of an equilateral triangle having a surface ijgh which contacts the surface ijgh of FIG. 8. The light beam is incident on the surface ijgh vertically thereto and reflected at a surface klhi so as to transmit through a surface jglk vertically thereto. The light beam having transmitted through the surface jglk is incident on the objective lens and focused on the recording film surface of the disk. Since a reflected beam from the disk surface is collimated to a parallel beam which returns to the surface jglk, a reflection preventive film may be preferably coated on the surface jglk.

In the foregoing, the two separate prisms of equilateral triangle form shown in FIGS. 8 and 9 are used, but they may be put together through the surface jghi to take a unitary form.

Conventionally, components of the above optics have been used in various combinations but the optical head of the present invention contemplates reduction in size and weight and features a semiconductor laser 211 and a photodetector 221 which are arranged on the same side as shown in FIGS. 5A and 5B. The blocks described previously with reference to FIGS. 7 to 9 can be manufactured with very high accuracies by using the presently available working technique. By putting together these highly precise blocks, a complex prism 210 can be realized having the four functions of a beam shaping prism, polarization beam splitter, ¼ wavelength plate and total reflection mirror. Advantageously, the complex prism 210 is small sized and its optical axis is less inclined.

As described above, with the optical disk in card capable of suppressing the surface deflection of the disk to below a predetermined value, a significant reduction in thickness of the optical head can be achieved. The overall construction of the information processing apparatus will now be described.

Figure 10:
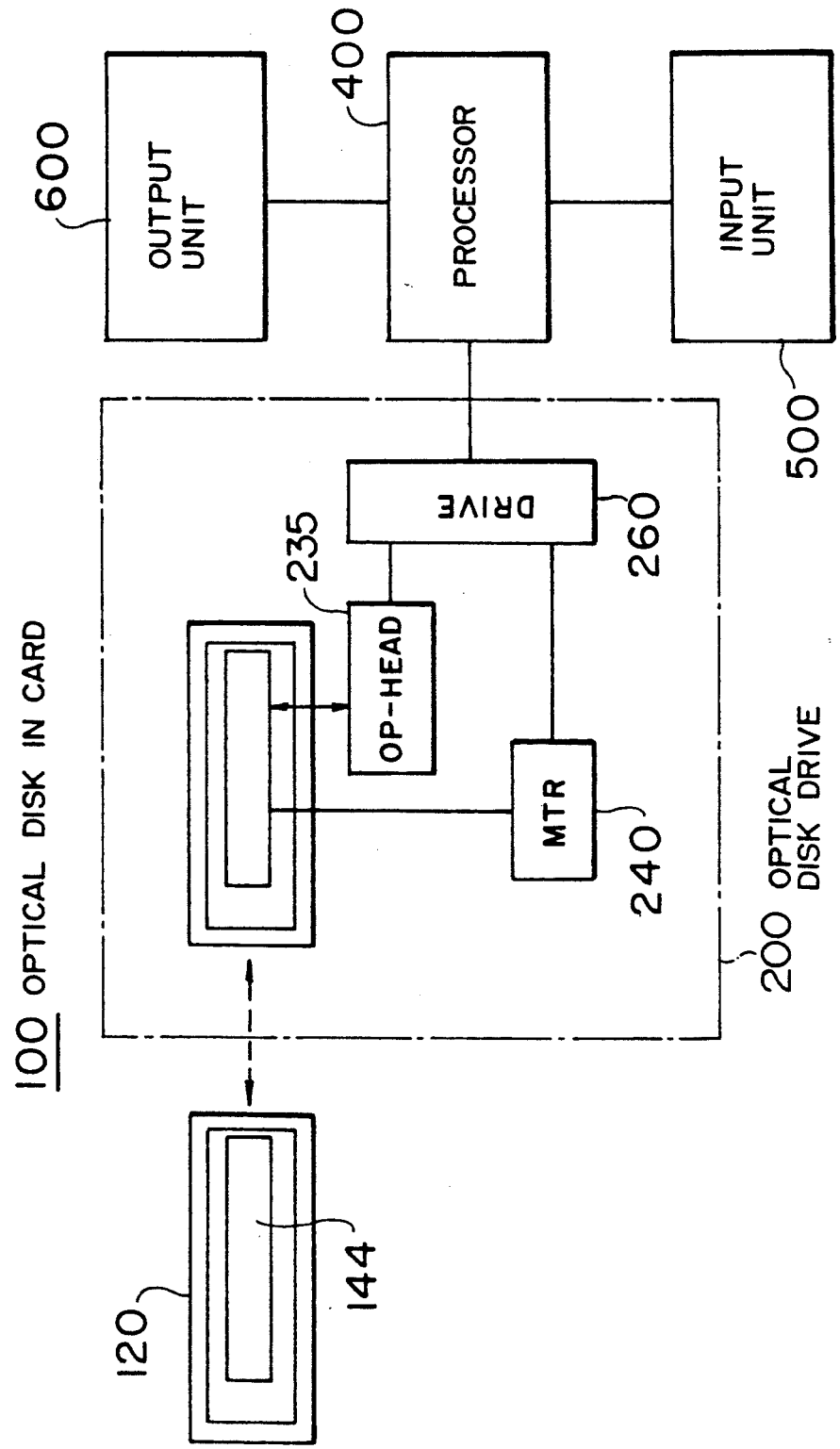
FIG. 10 is a schematic diagram showing an embodiment of an information processing apparatus using the optical disk in card according to the invention.

Referring to FIG. 10, the information processing apparatus comprises an optical disk in card 100, an optical disk drive 200, a processor 400, an input unit 500 and an output unit 600. The optical disk in card 100 includes an optical recording medium 144 and a transparent protective case 120 and it is removably mounted in the optical disk drive 200.

The optical disk drive 200 includes an optical head 235 for recording, reproduction and erase operations, a motor 240 for rotation of the optical recording medium 144 and a control drive circuit 260 for the optical head 235 and motor 240.

The drive circuit 260 responds to a command from the processor 400 to control the speed of rotation of the motor 240 and functions to modulate data for recording and erasing and to demodulate data for reproduction.

The processor 400 responds to a command from the input unit 500 to carry out operation processing or recording, reproduction and erasing in respect of the optical recording medium and as necessary, delivers information or operation results recorded on the optical recording medium through the output unit 600.

Figure 11A:
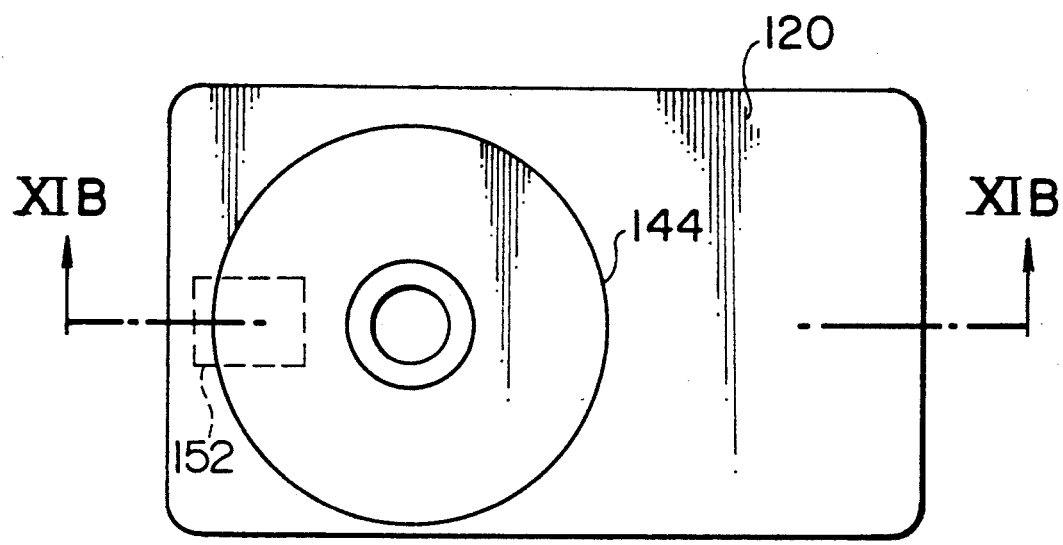
FIG. 11A is a plan view of the optical disk in card.
Figure 11B:
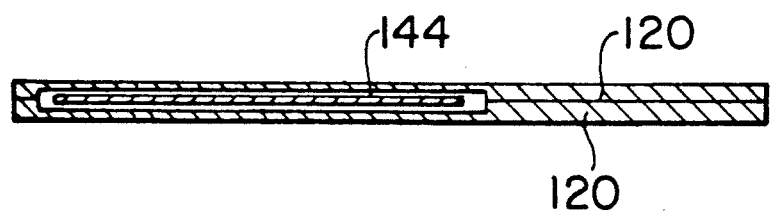
FIG. 11B is a sectional view taken on the arrow line XIB—XIB of FIG. 11A.

FIGS. 11A and 11B show an embodiment of the optical disk in card suitable for implementation of the invention. FIG. 11A is a plan view and FIG. 11B is a sectional view. As shown in these figures, in the optical disk in card, an optical recording medium 144 is incorporated in a protective case 120 of credit card size. Advantageously, in the optical disk in card of the present embodiment, at least a light beam incident portion 152 of the protective case 120 is constructed of a transparent protective plate.

In the conventional information processing apparatus, upon irradiation of light, a door of the protective case was opened to permit the light to be incident directly on the substrate of the optical recording medium. Accordingly, dust and dirt went in the opening for the light-incidence door and a countermeasure thereagainst required that the substrate be formed of a 1.2 mm thick transparent substrate. In contrast therewith, the light beam incident portion 152 of the optical disk in card used in the present invention is covered with the transparent protective plate and therefore dust and dirt are less likely to be deposited directly on the substrate 143 or the optical recording medium 144 and the thickness of the substrate for supporting the optical recording medium need not be 1.2 mm. Moreover, in the optical disk in card, the optical recording medium is not fixed to the protective case but is freely rotatable therein.

Figure 12:
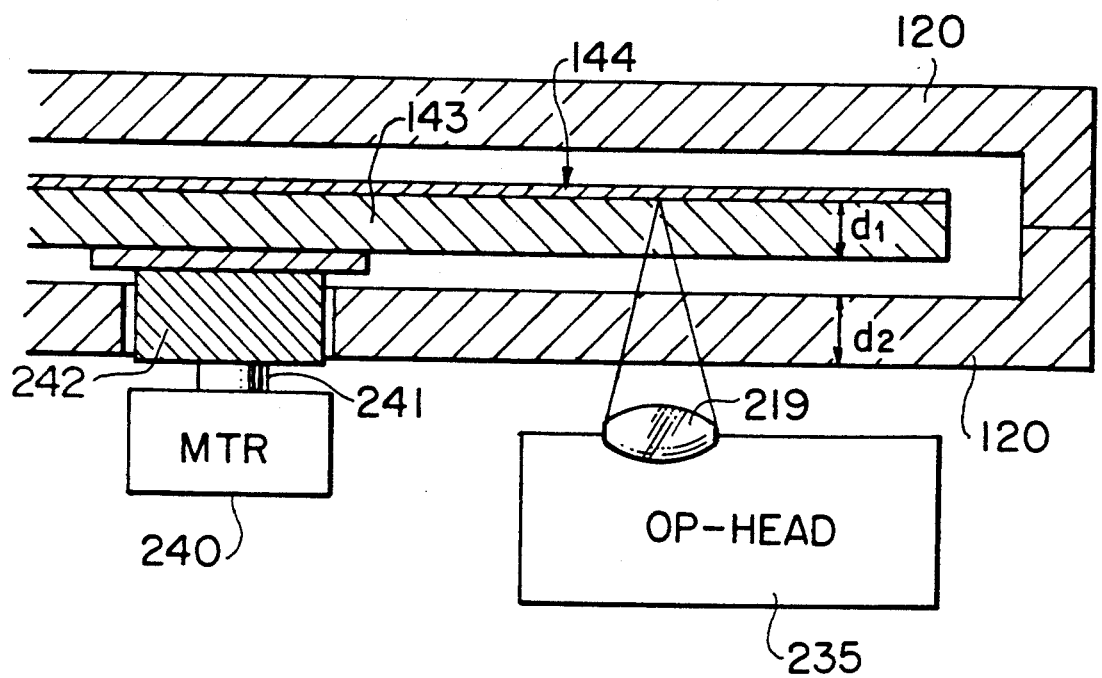
FIGS. 12 and 13 are sectional views showing other embodiments of the optical disk in card according to the invention.

The concept of the optical disk in card will be described with reference to FIGS. 12 and 13. Since the substrate, 143, for supporting the optical recording medium 144 is rotatable inside the transparent protective case 120 for protection of the medium 144, the surface deflection of the disk is smaller than the width of the space between the medium and case. Additionally provided are the motor 240 for rotation of the disk and the optical head 235. Preferably, the optical head 235 may be reduced in thickness as shown in FIGS. 5A and 5B but otherwise the conventional optics may be employed. With the above construction, recording, reproduction and erasing for the optical disk are effected as will be described below.

Figure 14:
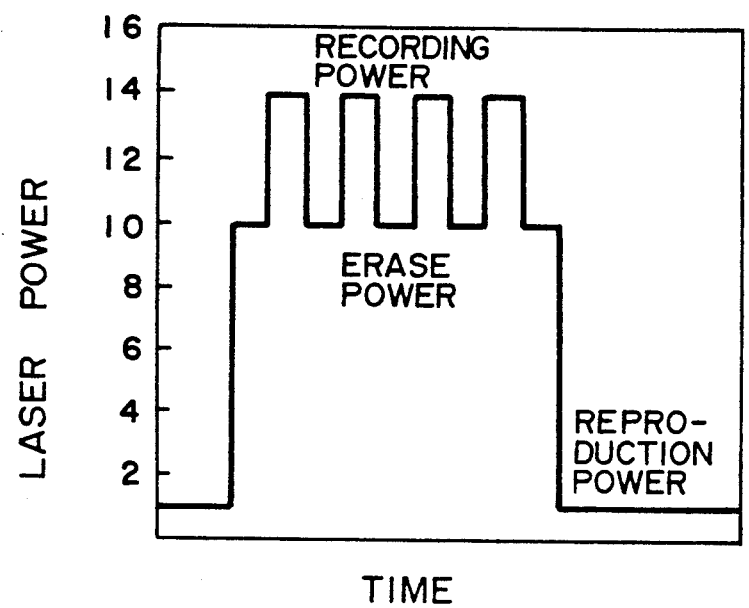
FIG. 14 is a graph for explaining a method of modulating laser power when overwriting.

More particularly, for recording and erasing, the power of the semiconductor laser comprised in the optical head 235 is modulated between an erase power level and a recording power level as shown in FIG. 14 in order that new information is recorded on old information. Upon reproduction, the power of the semiconductor laser is reduced to a relatively reproduction power level and irradiated continuously, thereby reading the reflection factor of the optical disk. Advantageously, in the optical disk in card used for the present invention, the laser beam is irradiated on the optical recording medium 144 through the transparent protective case 120. Consequently, according to the present invention, dust in the air is less likely to be deposited on the substrate and the recording film and degradation of the signal due to dust deposition can be alleviated. Further, by making the sum of a thickness d2 of transparent protective case 120 and a thickness d1 of substrate 143 approximately 1.2 mm, the reduction in thickness of the 1.2 mm substrate, which has hitherto been considered to be indispensable, can be achieved to advantage.

Figure 13:
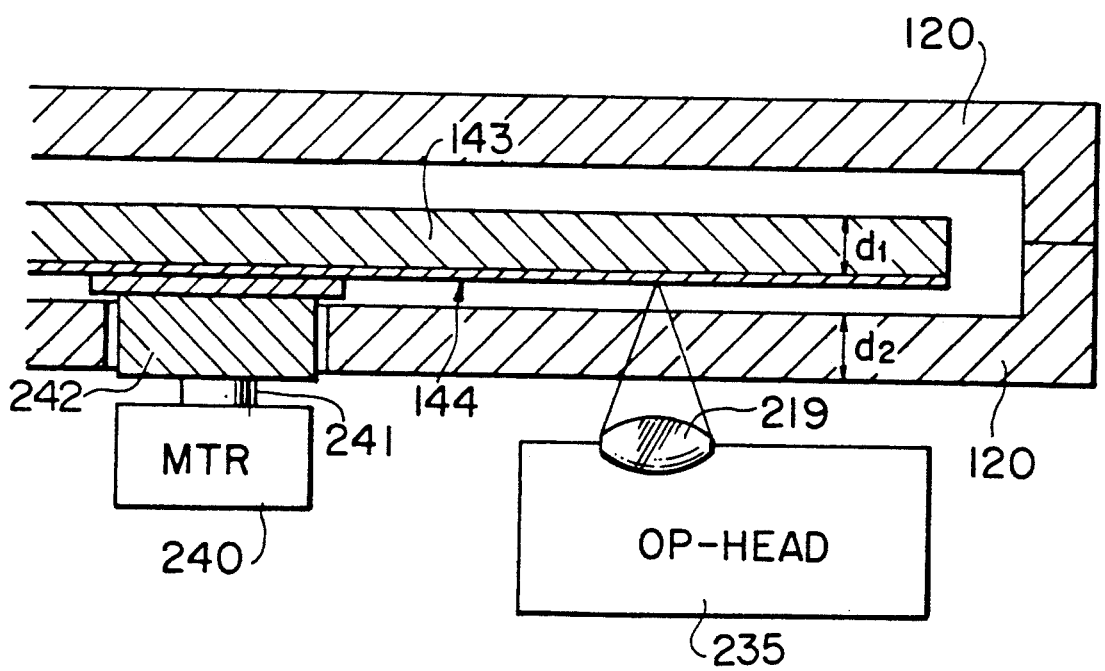

Similarly, in the optical disk in card used for the present invention, with the thickness d2 of the transparent protective case set to a proper value, the light beam need not be irradiated from the side of the substrate 143 as shown in FIG. 13 and the substrate 143 can be made of a non-transparent material. With the thickness d2 of the transparent protective case set to 1.2 mm, the substrate 143 made of a non-transparent material can be used together with an objective lens having the conventional specification. The optical recording medium is fixed to a rotary shaft 241 so as to be rotatable and is retained for stable rotation by means of a disk retainer 242. Except for the light beam incident portion, the protective case may be either transparent or opaque. Character 219 designates the objective lens.

As the optical recording medium suitable for implementation of the invention, a reproduction only type optical recording medium such as a compact disk, a write-once type optical recording medium utilizing pit and phase change and a rewrite type optical recording medium utilizing an optomagnetic effect and phase change can be used. In other words, any type of medium capable of undergoing recording, reproduction and erasing under the irradiation of a laser beam can be used.

Figure 15:
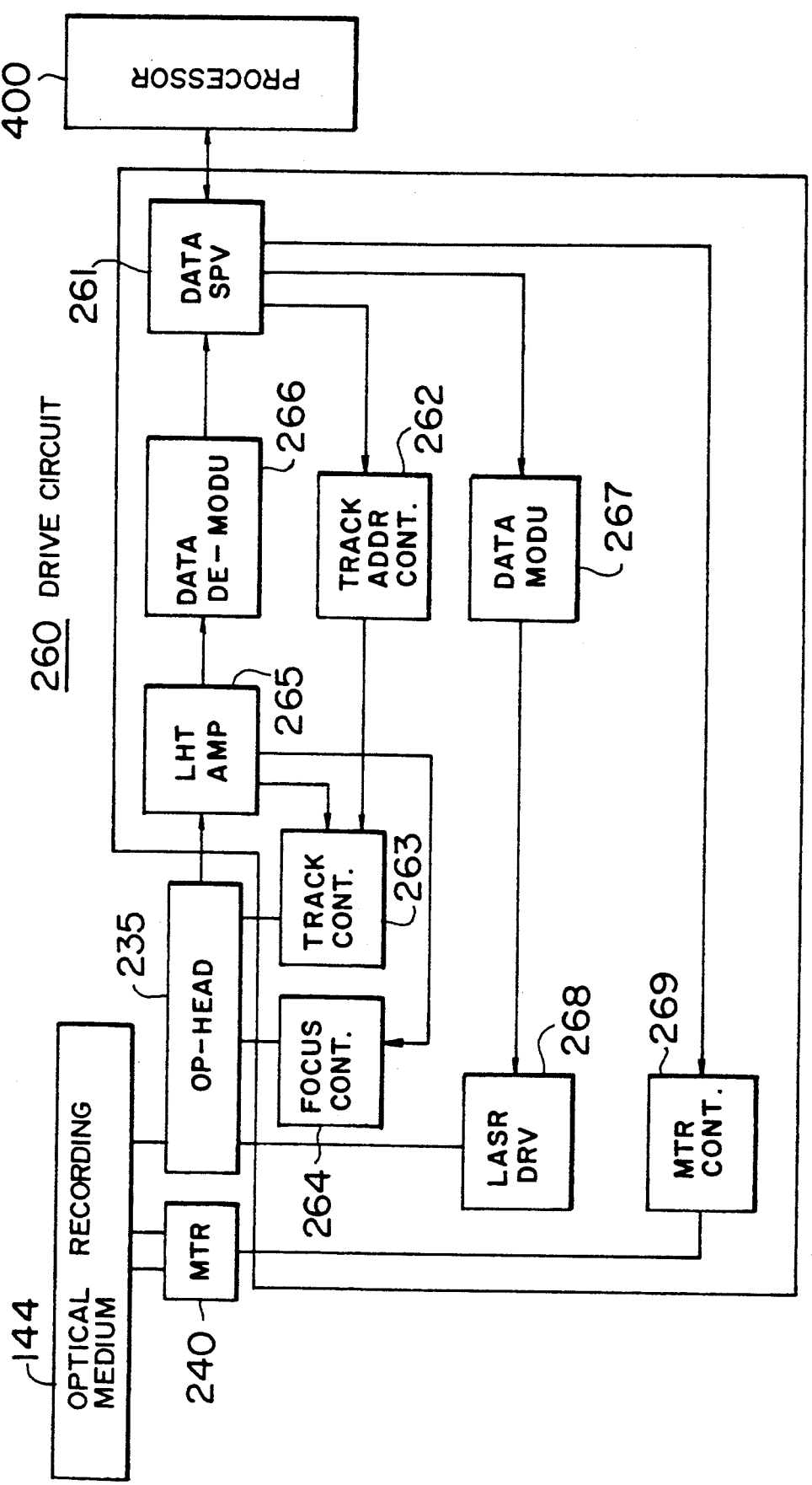
FIG. 15 is a block diagram showing an embodiment of a drive circuit system needed for implementation of the invention.

FIG. 15 shows details of the drive circuit 260. The drive circuit 260 comprises a data supervisor 261, a track address controller 262, a track controller 263, a focus controller 264, a light detection amplifier 265, a data demodulator 266, a data modulator 267, a laser drive 268, and a motor controller 269. With the above construction, for recording and erasing of data, the track address controller 262 determines a track address to be recorded and the data modulator 267 converts data supplied from the processor 400 into a "0", "1" pattern to be recorded in the optical recording medium 144, in accordance with the modulation scheme. Available as the modulation scheme are 2–7 modulation and 4–15 modulation which are used in compliance with the type of system. In the laser drive 268, the laser power is modulated between an erase power level and a record power level as shown in FIG. 14 in accordance with the "0", "1" pattern determined by the data modulator 267.

Upon reproduction of data, a drive address designated by the processor 400 is selected and the laser power is set to a constant value of about 1 to 2 mW and under this condition, the light detection amplifier 265 reads the reflection factor of the optical recording medium 144, and the data demodulator 266 demodulates data.

The results obtained from the light detection amplifier 265 are also used as signals for the track controller 263 and focus controller 264. These controllers function in the same way as the controllers used in the information processing apparatus conventionally represented by the compact disk. The motor controller 269 controls the rotation speed of the motor 240 for rotation of the optical recording medium 144.

What is claimed is:

1. An information storage device for an information processing apparatus comprising:

an optical memory having an optical recording medium for storing information and being rotatably mounted in a case in such a way that surface fluctuations of the optical recording medium are limited to a range of from 0.1 mm to 0.9 mm during rotation in the case;

an optical head for irradiating light, which is focused by means of an objective lens having an effective diameter of 1.0 to 3.8 mm on said optical recording medium, to perform at least one of recording information on said optical recording medium, reproducing information recorded on said optical recording medium and erasing information recorded on said optical recording medium;

rotation means for rotating said optical recording medium in said case; and drive means electrically connected to said optical head and said rotation means for controlling operation of said optical head and the speed of rotation of said optical recording medium by said rotation means.

2. An information storage device for an information processing apparatus, comprising:

an optical head for supplying light to an optical memory having an optical recording medium to be irradiated by said light for storing information, which optical recording medium is rotatably mounted in a case in such a way that surface fluctuations of the optical recording medium are limited to a range of from 0.1 mm to 0.9 mm during rotation in the case, and an objective lens having an effective diameter of 1.0 mm to 3.8 mm for focusing said light on said optical recording medium to perform at least one of recording information on said optical recording medium, reproducing information recorded on said optical recording medium and erasing information recorded on said optical recording medium;

rotation means for rotating said optical recording medium in said case; and drive means electrically connected to said optical head and said rotation means for controlling operation of said optical head and the speed of rotation of said optical recording medium by said rotation means.

3. An information storage device for an information processing apparatus comprising:
   an optical head for supplying light to an optical memory having an optical recording medium to be irradiated by said light for storing information, which optical recording medium is rotatably mounted in a case in such a way that surface fluctuations of the optical recording medium are limited to a range of from 0.1 mm to 0.9 mm during rotation in the case, and an objective lens having a focal distance of 1.0 mm to 3.8 mm for focusing said light on said optical recording medium to perform at least one of recording information on said optical recording medium, reproducing information recorded on said optical recording medium and erasing information recorded on said optical recording medium;
   rotation means for rotating said optical recording medium in said case; and
   drive means electrically connected to said optical head and said rotation means for controlling operation of said optical head and the speed of rotation of said optical recording medium by said rotation means.

4. An information storage device for an information processing apparatus, comprising:
   an optical head for supplying light to an optical memory having an optical recording medium to be irradiated by said light for storing information, which optical recording medium is rotatably mounted in a case in such a way that surface fluctuations of the optical recording medium are limited to a range of from 0.1 mm to 0.9 mm during rotation in the case, and an objective lens mounted for movement within a range of 0.2 mm to 1.8 mm for focusing said light on said optical recording medium to perform at least one of recording information on said optical recording medium, reproducing information recorded on said optical recording medium and erasing information recorded on said optical recording medium;
   rotation means for rotating said optical recording medium in said case; and
   drive operation of said optical head and the speed of rotation of said optical recording medium by said rotation means.

5. An information storage device for an information processing apparatus according to claim 1, further comprising a collimate lens of an effective diameter larger than said objective lens for collimating dispersed light into a parallel beam which is focused by said objective lens on said optical recording medium to execute at least one of recording information on said optical recording medium, reproducing information recorded on said optical recording medium and erasing information recorded on said optical recording medium.

6. An information storage device for an information processing apparatus according to claim 1, further comprising a collimate lens having a focal distance greater than that of said objective lens for collimating dispersed light into a parallel beam which is focused by said objective lens on said optical recording medium to execute at least one of recording information on said optical recording medium, reproducing information recorded on said optical recording medium and erasing information recorded on said optical recording medium.

7. An apparatus comprising:
   an optical head having an objective lens for focusing light through a transparent substrate of an optical recording medium, said transparent substrate having a thickness of 0.3 to 1.0 mm, so as to execute at least one of recording information on said optical recording medium, reproducing information recorded on said optical recording medium and erasing information recorded on said optical recording medium, said objective lens having an effective diameter of 2.0 mm, so as to permit positioning of said objective lens in such proximity to said optical recording medium as to permit a dimension of the apparatus to be reduced;
   means for causing relative motion between said objective lens and said optical recording medium; and
   means for applying to said optical head a signal for recording information on said optical recording medium, reproducing information recorded on said optical recording medium and erasing information recorded on said optical recording medium.

8. An optical head comprising:
   a semiconductor laser as a light source;
   a collimate lens for collimating dispersed light emitted from said semiconductor laser into a parallel beam;
   a total reflection mirror for changing the optical path of the light beam passing through said collimate lens;
   an objective lens of an effective diameter of 1.0 to 3.8 mm for focusing the light beam reflected by said total reflection mirror onto an optical recording medium through a transparent substrate of said optical recording medium, said transparent substrate having a thickness of 0.3 to 1.0 mm, whereby the dimension of said total reflection mirror and the positioning of said objective lens with respect to said optical recording medium can be set to provide an optical head of reduced height; and
   a beam splitter for leading the light beam reflected by said optical recording medium to a photodetector.

9. An optical head comprising:
   a semiconductor laser as a light source;
   a collimate lens for collimating dispersed light emitted from said semiconductor laser into a parallel beam;
   an optical element of a unitary structure comprised of a prism for shaping the light beam passing through said collimate lens;
   a mirror for changing the optical path of the light beam shaped by said prism;
   an objective lens of an effective diameter of 2.0 mm for focusing the light beam reflected by said mirror on an optical recording medium through a transparent substrate of said optical recording medium, said transparent substrate having a thickness of 0.3 to 1.0 mm, whereby the dimension of said mirror and the positioning of said objective lens with respect to said optical recording medium can be set to provide an optical head of reduced height;
   a splitter for leading the light beam reflected by said optical recording medium to a photodetector; and
   a ¼ wavelength plate for polarizing the light beam passing through said splitter and the light beam reflected by said optical recording medium.

10. An optical head comprising:
    a semiconductor laser as a light source;

a collimate lens for collimating dispersed light emitted from said semiconductor laser into a parallel beam;

an optical element for shaping the parallel beam from said collimate lens, changing the optical path to irradiate the shaped light beam on an optical recording medium and leading the light beam reflected by said optical recording medium to a photodetector; and an objective lens of an effective diameter of 1.0 to 3.0 mm for focusing the light beam on the optical path from said optical element onto said optical recording medium through a transparent substrate of said optical recording medium, said transparent substrate having a thickness of 0.3 to 1.0 mm, whereby the dimension of said optical element and the positioning of said objective lens with respect to said optical recording medium can be set to provide an optical head of reduced height.

11. An optical head according to claim 10, wherein said photodetector for detecting the light beam from said optical element and said semiconductor laser are arranged on the same side of said optical element.

12. An information storage device for an information processing apparatus according to claim 1, further comprising:

a processor for supplying an output to said drive means to control said drive means.

13. An information storage device for an information processing apparatus according to claim 1, wherein said case includes a transparent portion and said optical head is disposed so that said light is focused by said objective lens and transmitted through said transparent portion of said case so as to irradiate said optical recording medium.

14. An information storage device for an information processing apparatus according to claim 1, wherein said optical recording medium is formed on a transparent substrate having a thickness in the range of 0.03 mm to 1.0 mm.

15. An information storage device for an information processing apparatus according to claim 14, wherein said optical memory, said optical head, said rotation means and said drive means are mounted in a space having height of 6 mm to 15 mm.

16. An information storage device for an information processing apparatus according to claim 1, wherein said optical memory, said optical head, said rotation means and said drive means are mounted in a space having height of 6 mm to 15 mm.

17. An information storage device for an information processing apparatus, comprising:

an optical head having (a) means for supplying light to an optical memory which includes (i) a disk having an optical recording medium for recording information and a transparent substrate having a thickness of 0.3 to 1.0 mm for supporting said optical recording medium, and (ii) a case in which said disk is mounted for rotation with a narrow gap of 0.1 to 0.9 mm between a surface of the disk and an inside surface of the case so that the rotation fluctuation of the disk in a vertical direction is limited by said case; (b) an objective lens having an effective diameter of 1.0 to 3.8 mm for focusing the light on the optical recording medium through the transparent substrate; and (c) an actuator for driving the objective lens within an operation distance toward and away from said optical memory, said objective lens being spaced from said optical memory such that said objective lens can not contact said optical memory as said objective lens is moved through said operation distance by said actuator;

spacing between said objective lens and said rotation means for rotating said disk in said case of said optical memory; and drive means electrically connected to the optical head and the rotation means for controlling operation of the optical head and rotation of said disk by the rotation means.

18. An information storage device for an information processing apparatus, comprising:

an optical head having (a) means for supplying light to an optical memory which includes (i) a disk having an optical recording medium for recording information and a transparent substrate having a thickness of 0.3 to 1.0 mm for supporting said optical recording medium, and (ii) a case in which said disk is mounted for rotation with a narrow gap of 0.1 to 0.9 mm between a surface of the disk and an inside surface of the case so that the rotation fluctuation of the disk in a vertical direction is limited by said case; (b) an objective lens having a focal distance of 1.0 to 3.8 mm for focusing the light on the optical recording medium through the transparent substrate; and (c) an actuator for driving the objective lens within an operation distance toward and away from said optical memory, said objective lens being spaced from said optical memory such that said operation distance of the actuator is less than the focal distance of the objective lens when recording information on the optical recording medium, reproducing information recorded thereon and erasing information recorded thereon;

rotation means for rotating said disk in said case of said optical memory; and drive means electrically connected to the optical head and the rotation means for controlling operation on the optical head and rotation of said disk by the rotation means.

19. An information storage device for an information processing apparatus, comprising:

an optical head having means for supplying light to an optical memory in which an optical recording medium for recording information is rotatably mounted in a case such that a surface fluctuation of the optical recording medium during rotation is limited to a range from 0.1 to 0.9 mm in the case, an objective lens having an effective diameter of 1.0 to 3.8 mm for focusing said light on the optical recording medium, an optical element for leading the light to the objective lens, and a photodetector disposed on the side of the optical element opposite said objective lens and spaced from the rotational axis of the optical recording medium for detecting light reflected from the optical recording medium;

rotation means for rotating said disk in said case of said optical memory; and drive means electrically connected to the optical head and the rotation means for controlling operation of the optical head and rotation of said optical recording medium by the rotation means.

20. An information storage device for an information processing apparatus according to claim 19, wherein said optical element comprises a mirror disposed at an angle to the optical axis of said objective lens for changing the path of said light from said light supplying means to said objective lens.

21. An information storage method for an information processing apparatus including an optical head having means for applying light to an optical memory in which an optical recording medium for storing information is mounted for rotation, and an objective lens having an effective diameter of 1.0 to 3.8 mm for focusing said light on the optical recording medium, the method comprising the steps of:

rotating said optical recording medium in said case;

limiting the surface fluctuation of said optical recording medium to a range of 0.1 mm to 0.9 mm as said optical recording medium is rotated in said case;

driving the objective lens within an operation distance toward and away from said optical recording medium such that said objective lens reaches but does not contact said optical recording medium when said objective lens is moved to the full extent of said operation distance toward said optical recording medium; and executing at least one of recording information to the optical recording medium, reproducing information recorded thereon and erasing information recorded thereon, by rotating the optical recording medium in the case and irradiating a light from the optical head to the optical recording medium.

22. An apparatus according to claim 7, wherein said optical head has a semiconductor laser as a light source, and a collimate lens having a focal distance of not greater than 6.7 mm for collimating dispersed light emitted from said semiconductor laser into a parallel beam and directing said parallel beam to said objective lens.

23. An apparatus according to claim 22, wherein said collimate lens has a diameter of not greater than 4 mm.

24. An optical head according to claim 8, wherein said collimate lens has a focal distance of not greater than 6.7 mm.

25. An optical head according to claim 24, wherein said collimate lens has a diameter of not greater than 4 mm.

26. An optical head according to claim 9, wherein said collimate lens has a focal distance of not greater than 6.7 mm.

27. An optical head according to claim 26, wherein said collimate lens has a diameter of not greater than 4 mm.

28. An optical head according to claim 10, wherein said collimate lens has a focal distance of not greater than 6.7 mm.

29. An optical head according to claim 28, wherein said collimate lens has a diameter of not greater than 4 mm.

* * * * *